Figure 1:
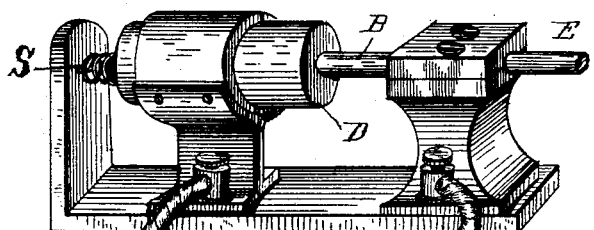

(No Model.)

E. THOMSON.
METHOD OF ELECTRIC FORGING.

No. 396,010. Patented Jan. 8, 1889.

WITNESSES:
Ira R. Steward.
Hm. N. Capel

INVENTOR
Elihu Thomson
BY
Townsend & MacArthur
ATTORNEYS

UNITED STATES PATENT OFFICE.

ELIHU THOMSON, OF LYNN, ASSIGNOR TO THE THOMSON ELECTRIC WELDING COMPANY, OF BOSTON, MASSACHUSETTS.

METHOD OF ELECTRIC FORGING.

SPECIFICATION forming part of Letters Patent No. 396,010, dated January 8, 1889.

Original application filed May 21, 1886, Serial No. 202,842. Divided and this application filed February 6, 1888. Serial No. 263,153. (No model.)

*To all whom it may concern:*

Be it known that I, ELIHU THOMSON, a citizen of the United States, and a resident of Lynn, in the county of Essex and State of Massachusetts, have invented a certain new and useful Method of Electric Forging, of which the following is a specification.

My present invention relates to a new method or art in which the heating-power of electric currents is utilized for forging operations, and more particularly in forging operations in the nature of upsetting, whereby an enlargement is formed upon the ends or sides of metal bars, or other shapes of metals, for a variety of useful purposes.

Briefly, my invention consists in passing, by suitable clamps, a heavy electric current through the part of the bar or other piece to be operated upon, so as to bring such part to a working-heat irrespective of the other portions not to be forged or otherwise treated, and then shaping by pressure, or by hammering, or other convenient application of force, to effect an upsetting operation, and in such a manner as to move the heated particles in the direction required to give the work the intended or desired form.

The invention may be utilized by way of forming expanded heads on large bars, or by forming beads or projections from the sides of such bars, or by forming shoulders, necks, or projections of any kind which result from an endwise compression of an object under the welding heat of an electric current and a lateral displacement of its heated particles.

The accompanying figures will illustrate my invention in some of its applications.

It is assumed that the conductors mentioned herein lead from a source of very heavy electric currents—such as a secondary coil of an induction-coil of few turns whose primary is fed by alternating currents—or a secondary battery of large surface, or a dynamo-machine with very heavy conductors, or an alternator in which the armature has only a few convolutions of heavy conductor, or a continuous-current machine of a unipolar type in which the currents are generated by the revolution of copper tubes or disks through a uniform magnetic field. The force of the current should be under proper control in order that it may be adapted to the size and character of the part to be heated and formed. The same or similar current-generating devices may be used as described in prior applications filed by me relating to electric welding.

The advantages of utilizing the heating effects of an electric current are more apparent where the forging or welding operations are directed to some particular point or part of the metal bar or other piece, and, on the contrary, are not so apparent in cases where a continuous metal rod or bar is to be subjected to the same action throughout its length, as where the bar is to be rolled down or compressed by rolls through which it passes continuously.

Figure 2:
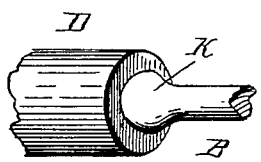
Figure 7:
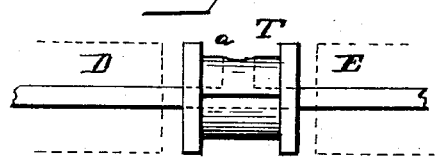
Figure 8:
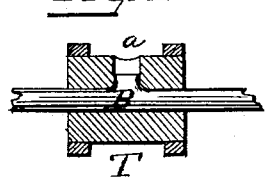
Figure 9:
Figure 10:

In the accompanying drawings, Figures 1 and 2 illustrate apparatus for forming enlarged heads on the ends of bars in accordance with my invention. Figs. 3, 4, 5, and 6 illustrate the formation of beads and collars in accordance with my invention. Figs. 7 and 8 illustrate apparatus for forming enlargements on the side of metal bars. Figs. 9, 10, 11, and 12 illustrate further useful applications of this phase of my invention.

Figure 4:
Figure 5:
Figure 6:
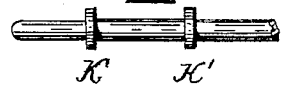
Figure 3:
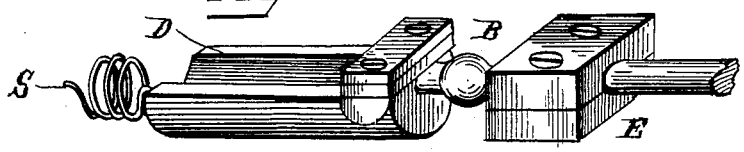

In Fig. 1, B is a metal bar firmly held in the fixed clamp E. D is a contact-block guided so as to be moved in a line with the clamp E by a force, as of a spring, S. The bar B abuts against the contact-block D, which is massive and a good conductor of electricity, and whose end in contact with B may be hollow or otherwise formed, as illustrated in Fig. 2. C C' are the terminals of the heating-current, which traverses the fixed block E, the metal bar B, and the block D. For convenience, the clamp E and the contact D are located at a short distance from each other, the bar B extending entirely through the clamp E with but a short length projecting from it, upon which the contact D bears. On the passage of the current the end of the bar B heats and is upset under the pressure of the spring exerted on the contact-block D, the result being an expanded head, K, as shown in Fig. 2. The same principle of operation is applicable to raise and form collars or beads or expanded portions on bars at other points than the ends. In accomplishing this result it is only necessary to clamp the bar or other metal piece on each side of the part where the bar or piece is to be swelled and then to pass the current through this small section, so as to heat the bar at that point and arrange one or both clamps to be movable toward each other by a pressure of any convenient kind. Thus in Fig. 3, B is the bar, as before, held in the fixed clamp E. D is a movable clamp, as in Fig. 1, forced toward clamp E by a spring, S. The clamp D takes hold of the bar at any desired point in its length, thereby determining by its relation to the clamp E the section of the bar or piece which is to be heated and upset. The current being on, as before, and the clamp D being moved toward the clamp E in the line of the bar B, the metal of the bar between the two knobs is heated and the particles are moved outwardly, in the nature of an upsetting operation, to form an expanded bead, as illustrated in Fig. 4. It is apparent that this bead or enlargement K may be turned down in a lathe to the form of a finished square collar, as indicated at K K', Fig. 6. In this form the beads will be useful for preventing end motion of a shaft and bearings. Where it is decided to have the expanded or upset portion only on one side of the bar, it is well to inclose the part of the bar operated upon in a non-conducting cover or mold, taking care that it does not fill the space between the clamps D and E and interfere with the end motion of compression. In Fig. 7 such a device is shown, and also in section in Fig. 8.

Figure 11:
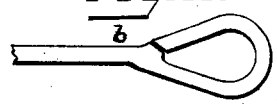
Figure 12:

The mold may consist, as shown, of a split tube of fire-clay or hard carbon, which loosely incloses the bar where it is to be heated, and is held in place thereon by bands encircling it, as shown. There is a lateral opening, $a$, in the mold, into which the bar B can expand or be upset when compressed endwise under the heat produced in it by the heating-current. This is indicated at B, Fig. 8, where a lateral projection on the bar B is shown. This knob or protuberance may be utilized in a variety of ways—as, for example, a lateral bar may be welded to the knob by my electric-welding process, which forms the subject of prior applications; or, the lateral projection $b$, Fig. 10, having been formed at a distance from the end of a bar, the end may be bent to shape, as shown in Fig. 11, and finally welded electrically as a ring, as shown in Fig. 12, thus forming a loop on the end of the bar.

It will be apparent that there are many other useful applications of my invention, and I do not therefore confine myself to the formation of the precise forms described, as those are only chosen as illustrative of my invention.

I do not claim in this application the invention, broadly, of heating by electric currents, so as to soften a metallic bar or other metal shape, and then shaping the parts so softened, that invention forming the subject of a prior application filed by me May 21, 1886, Serial No. 202,842, and of which application the present is a division.

What I claim as my invention is—

1. The herein-described art of upsetting metals into any desired shape, which consists in subjecting the blank to be worked to the heating action of a heavy electric current sufficient in volume to soften the same and then subjecting the blank to an endwise pressure, substantially as described.

2. The herein-described art or process of electric upsetting, consisting in clamping the bar or blank of metal at two points, leaving a section of the metal between the clamps, passing an electric current through the clamps and section of metal between them so as to soften the metal, then causing said blanks to approach each other in the line of the blank to upset the heated bar or blank between the clamps, substantially as specified.

3. The herein-described method of upsetting metal bars or blanks, which consists in heating the bars or blanks by electric currents traversing them and upsetting the metal bar into the desired shape.

4. The herein-described process of forming a lateral expansion or projection on a bar or piece of metal, consisting in passing a heavy electric current through the metal blank and then subjecting the blank to pressure while inclosed in a non-conducting mold having a lateral opening.

Signed at Lynn, in the county of Essex and State of Massachusetts, this 22d day of December, A. D. 1887.

ELIHU THOMSON.

Witnesses:
WALTER C. FISH,
OTIS K. STUART.